United States Patent [19]

Martin

[11] Patent Number: 4,493,235
[45] Date of Patent: Jan. 15, 1985

[54] AXIALLY ADJUSTABLE HELICAL CUTTING BLADES FOR ROTARY WEB SHEARING MACHINE

[76] Inventor: Merrill D. Martin, 2 Mall Ct., Oakland, Calif. 94608

[21] Appl. No.: 485,451

[22] Filed: Apr. 15, 1983

[51] Int. Cl.$^3$ ............................................. B23D 25/12
[52] U.S. Cl. ....................................... 83/303; 83/338; 83/342; 83/345; 83/672
[58] Field of Search ................. 83/342, 338, 303, 345, 83/348, 672, 700, 583

[56] References Cited

U.S. PATENT DOCUMENTS

| | | | |
|---|---|---|---|
| 2,183,722 | 12/1939 | Newman | 83/342 |
| 3,037,396 | 6/1962 | Martin | 74/409 |
| 3,068,731 | 12/1962 | Schultz | 83/342 |
| 3,380,328 | 4/1968 | Martin | 83/156 |
| 3,570,348 | 3/1971 | Hallden | 83/672 |
| 3,606,811 | 9/1971 | Hallden | 83/342 |
| 3,606,813 | 9/1971 | Hallden | 83/342 |
| 4,183,271 | 1/1980 | Martin | 83/156 |

OTHER PUBLICATIONS

Shigley, J. E., *Mechanical Engineering Design*, N.Y., McGraw Hill, 1977, pp. 320-323.

*Primary Examiner*—James M. Meister
*Assistant Examiner*—John L. Knoble
*Attorney, Agent, or Firm*—Alfons Puishes

[57] ABSTRACT

A rotary web shearing machine equipped with pairs of rotating helical blades, the improvement for adjusting the clearance between the blades which makes it unnecessary to adjust the blades by their individual holders while the machine is stationary, but makes it possible to effect this adjustment without shutting down the machine. This is accomplished either by providing that one of the blades remains in a fixed axial position, while the companion cutting blade holding shaft is moved axially with respect to the fixed blade. This is accomplished by the novel mechanism on the end of the shaft of said blade mounted in a special bearing and housing and equipped with an adjusting screw and nut which permits imparting of axial motion to the shaft while it is in rotation if desired and thus effecting a variation in the clearance between the pair of helical blades eliminating the necessity of shutting the machine down and resorting to manual adjustment of the blade holders to effect proper clearance. This adjustment becomes necessary frequently as the blades wear or their cutting action is otherwise impaired. I may also apply the same mechanism to each member of the pair of co-acting blades and obtain a greater adjustment in the clearance between blades. I may also effect this adjustment while the blades are stationary when occasion demands.

6 Claims, 6 Drawing Figures

AXIALLY ADJUSTABLE HELICAL CUTTING BLADES FOR ROTARY WEB SHEARING MACHINE

BACKGROUND OF THE INVENTION

The art of manufacture of corrugated cartons and the like entails the operation of cutting sections of the corrugated web as it discharges from the corrugating machine to predetermined lengths in a continuous process. For this purpose, machines having rotary cutting elements or knives which are programmed to properly shear the web as it moves through the machine continuously are utilized.

It has been found that the rotary knives or shears of the cutter operate more advantageously when the cutter or blade is mounted helically upon the rotary cutter. The helical configuration permits the cutting blade to move progressively through the web rather than making a straight through vertical cut which is accompanied by a high pressure resistance from the web instantaneously and consequence stress upon the machine.

The advantage of the helical rotary cutter was set forth in applicant's U.S. Pat. No. 3,380,328 issued Apr. 30, 1968 covering a single blade helical cutter.

In his U.S. Pat. No. 4,183,271, applicant describes and claims a web shearing machine employing a plurality of cutters arranged in pairs so that two helical cutters work in conjunction with each other as separate set of cutters with their obvious advantages.

The advantages of the helical cutters over the straight knife are set forth in substantial detail in applicant's U.S. Pat. No. 4,183,271.

While applicant has solved most of the existing problems in rotary web shearing machines, there remains one problem particularly associated with the helical blades. This is brought about by the necessity of maintaining the proper relationship between the cutting edges of the blades with special regard to clearance which problem is aggravated by wear on the blades, necessitating frequent shutdown of the machine to adjust the blades with respect to one another. This is an operation which must be performed during intervals of two weeks to a month depending upon the operation and requires several hours to perform which necessitates shutting down the whole production line for that length of time.

I have invented a device which provides for movement of at least one of the shafts carrying a helical cutting blade axially while the shaft is in motion and the companion blade remains in the same horizontal position, thus bringing the blades in closer proximity to each other and effecting the necessary cutting relationship between the blades and eliminating the necessity of shutting down the machine to effect this. Of course I may move both blades axially with respect to each other to effect even closer proximity. I may also effect this operation when the blades are stationary, especially when the machine is shut down for other reasons.

DETAILED DESCRIPTION OF A PREFERRED EMBODIMENT

Figure 1:
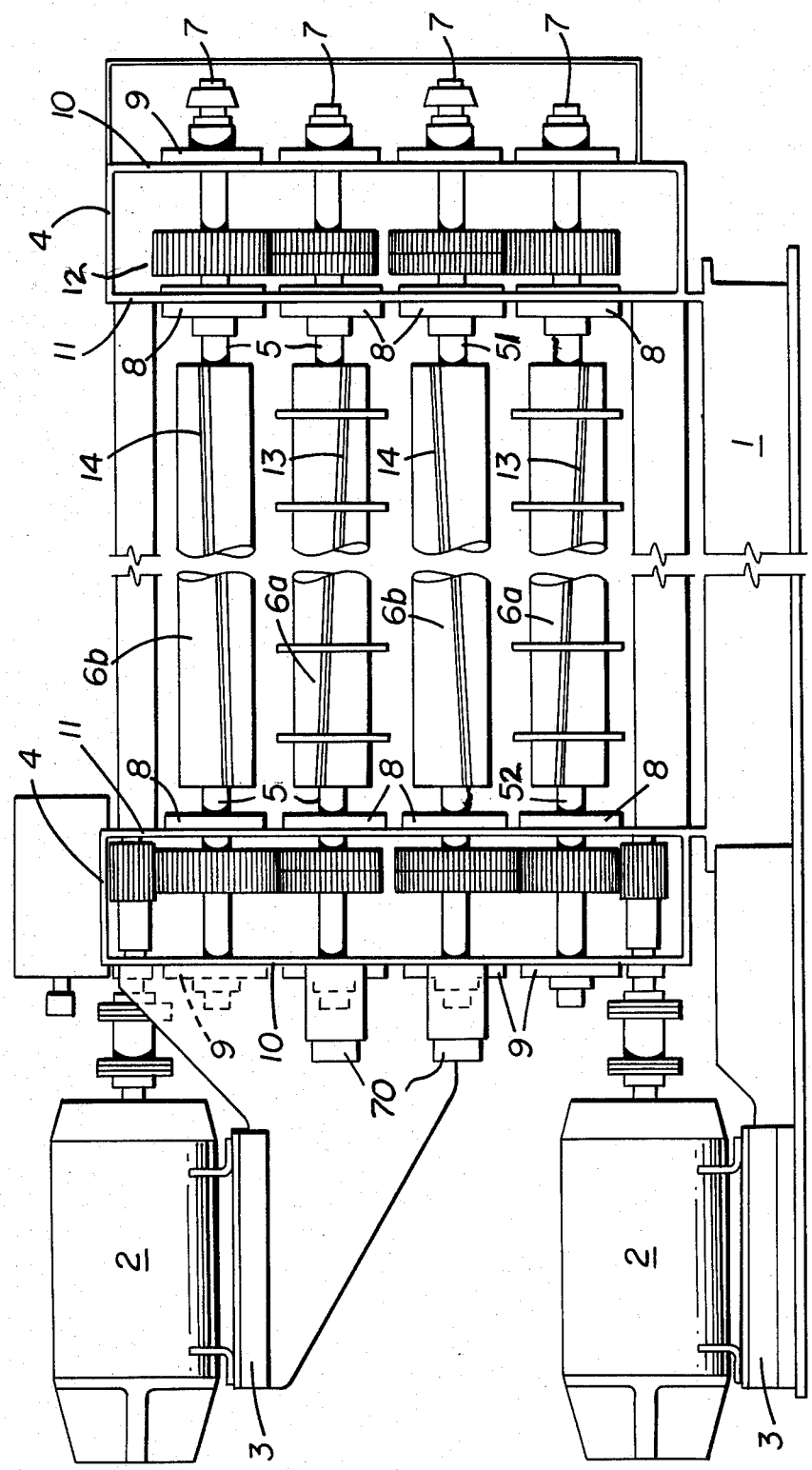
FIG. 1 is a side elevation of a multiple web rotary shear machine of the type used with this invention showing the general arrangement of the principal components as covered in U.S. Pat. No. 4,183,271 of applicant.

Referring first to FIG. 1, there is seen a machine base 1 which is concrete filled as described in applicant's previous patent, and motor drives 2 mounted on platforms 3. Bearing frames and gear housing are shown at 4 and drive shafts at 5, 51 and 52.

Rotating hollow cylinders are shown in pairs 6a, being lower, and 6b upper respectively.

Shaft ends are shown at 7, inside bearings at 8 and outside bearings at 9. Outside bearing support plates are seen at 10 and inside bearing support plates at 11, all forming a part of the bearing frames 4.

An anti-backlash transmission gearing train arrangements, as covered by applicant's U.S. Pat. No. 3,037,396 is shown at 12.

Lower helical cutting blades 13 are shown carried by hollow rollers 6a and upper helical cutting blades 14 shown carried by rollers 6b.

The digital encoders for the machine as described in U.S. Pat. No. 4,183,271, are shown at 70.

Figure 2:
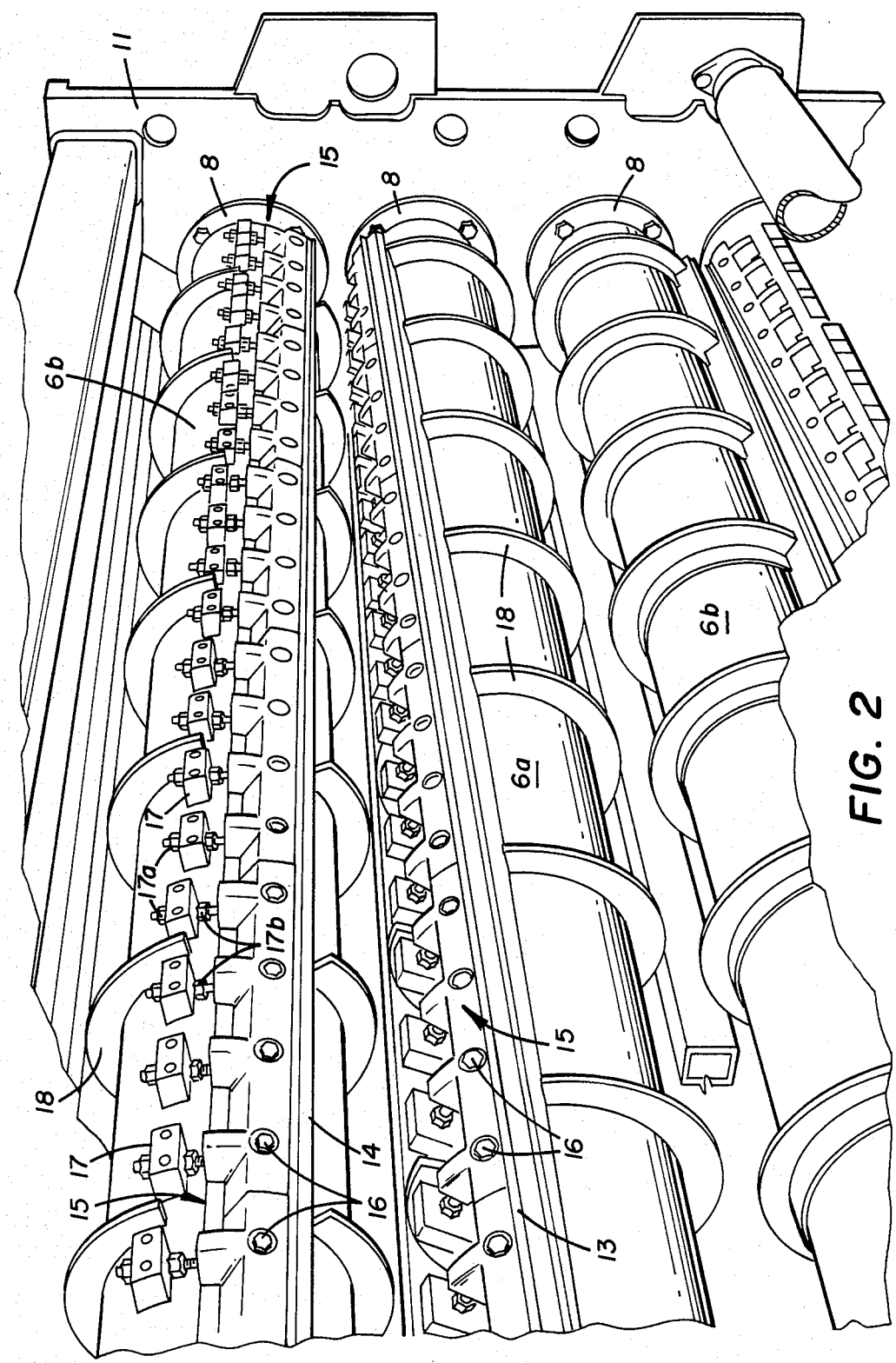
FIG. 2 is a front partial cut-away of the machine of FIG. 1 showing the arrangement of the rotary helical cutting blades and supports.

Referring now to FIG. 2, there are again seen somewhat enlarged cutting rollers 6a and 6b, having mounted thereon helical cutting blades 13 and 14 respectively. The cutting blades are held in position in the helical slots in the rollers by means of blade holding assemblies 15 which are fastened to the rotors by means of holding down screws 16 which provide a certain amount of slack for limited circumferential movement of the holding assemblies 15. The holding assemblies are fastened down against the rollers by fastening blocks 17 which are equipped with stud and nut adjustments 17a and 17b respectively which permit circumferential movement of the blade adjusting assemblies 15 and consequently adjustment of the blades themselves.

Semi-circular guides 18 are positioned on the rollers to prevent sagging of the cut-off end of the webs as they pass through the cutting blades 13 and 14.

Figure 3:
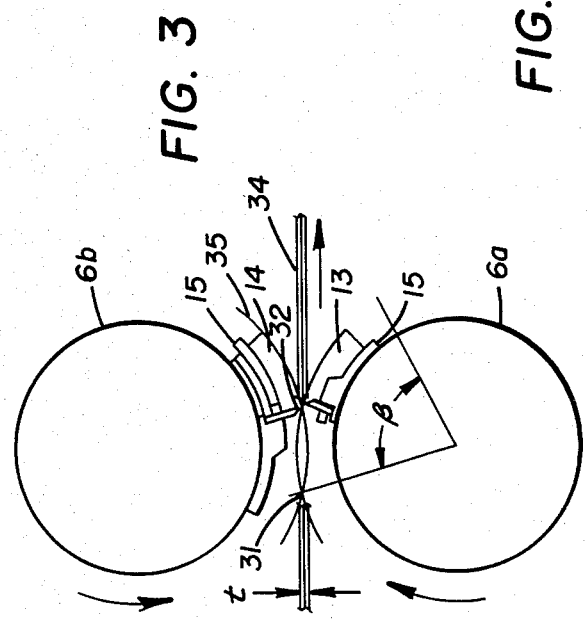
FIG. 3 is a schematic end view of the rollers showing the operation of the cutting blades with respect to each other.

To better understand the relative action of the helical cutting blades 13 and 14, reference should be had to the schematic diagram of FIG. 3. Web material 34 with thickness "t" makes initial contact with cutting edges at 31 and completes its cut at 32. The locus of the cutting blades as the cylinders rotate is indicated by curve 35 and the blades must rotate through an angle Beta for a completion of the cut which is governed by the velocity of web 34 as set forth in applicant's U.S. Pat. No. 4,183,271.

Figure 4:
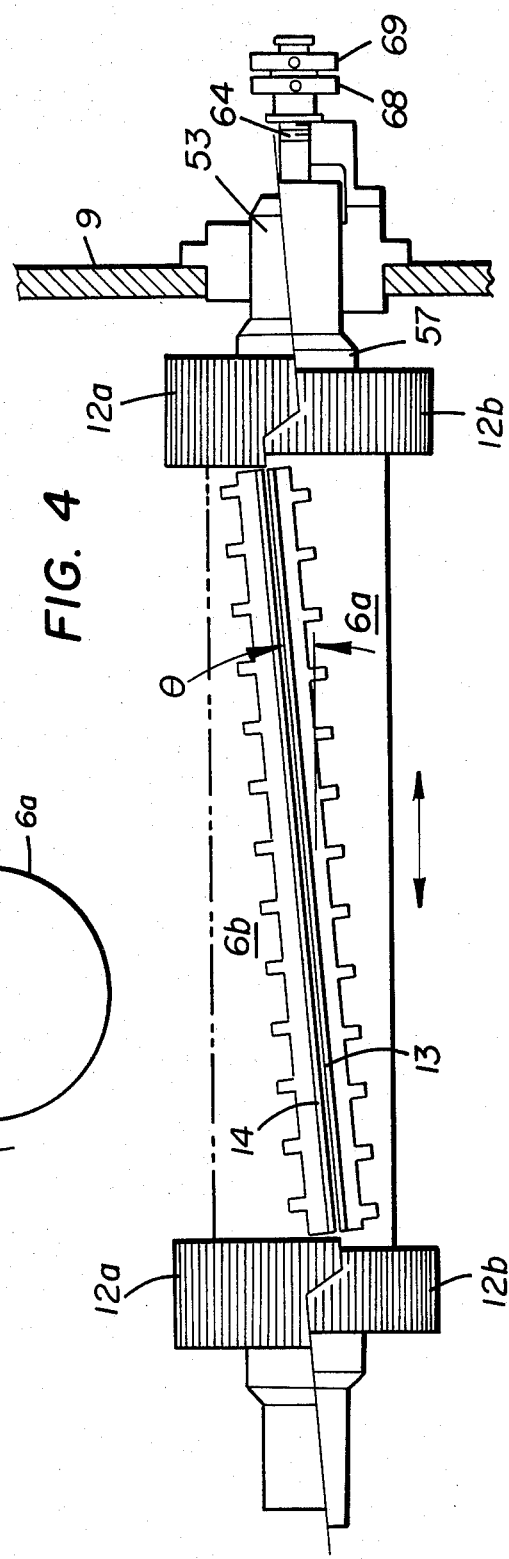
FIG. 4 is a schematic top view of one pair of rollers showing the helical blades in relative position at the end of the cut-off operation.

Referring now to FIG. 4, there is shown a top view illustrating the diagrammatic relation between the rollers 6a and 6b and the axial relative positioning of the helical cutting blades 13 and 14 as carried by the rollers. Lower rollers 6a carrying cutting blades 13 are arranged for axial horizontal movement with respect to blade 14 by means of horizontally movable shaft 57 as hereinbelow more fully described. It is evident from this diagram that axial motion of shaft 57 and of roller 6a relative to roller 6b brought about by movement of adjusting screw 64 and adjusting lug 68 as described more fully in FIG. 5, produces the desired relative motion between blade 13 and blade 14. The movement of the shaft is permitted by the fact that the backlash preventing gear train 12 in this instance is constructed so that the faces of the upper pinions 12a are at least one inch wider than the lower pinions 12b, thereby permitting one-half inch travel of the shaft horizontally in either direction.

Figure 5:
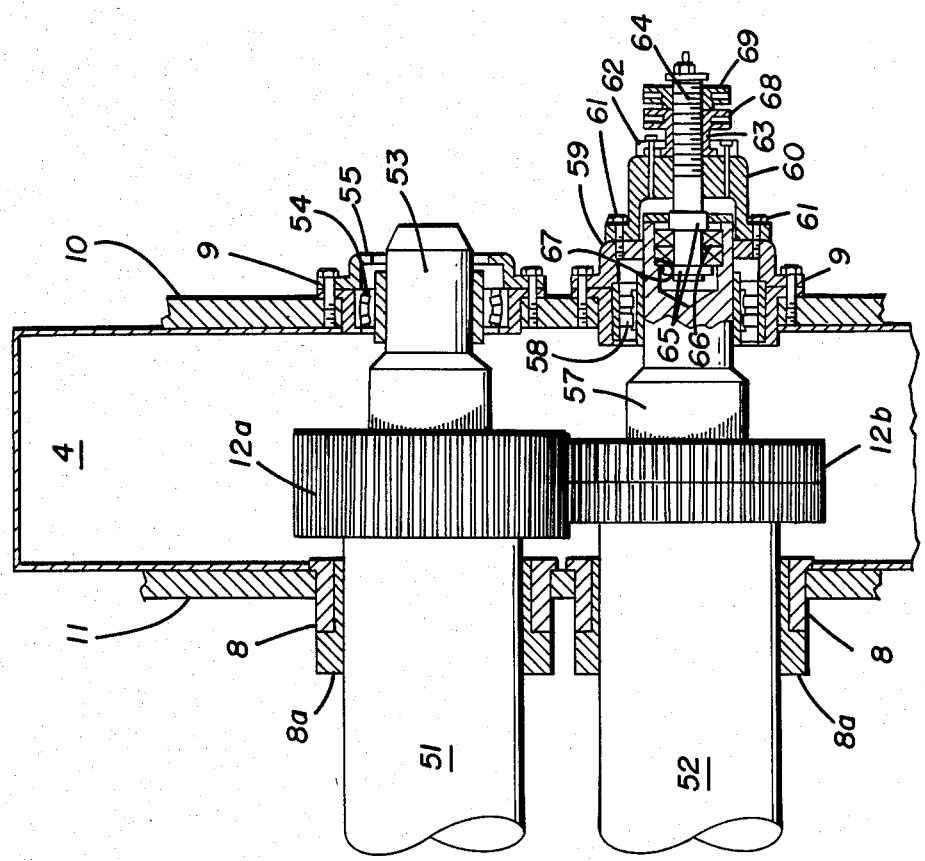
FIG. 5 is a cut-away showing in section the improved drive and support arrangement at the right end of one set of rollers looking towards FIG. 1 which provides for the axial movement of one of the shafts, in this case, the bottom shaft and roller.
Figure 6:
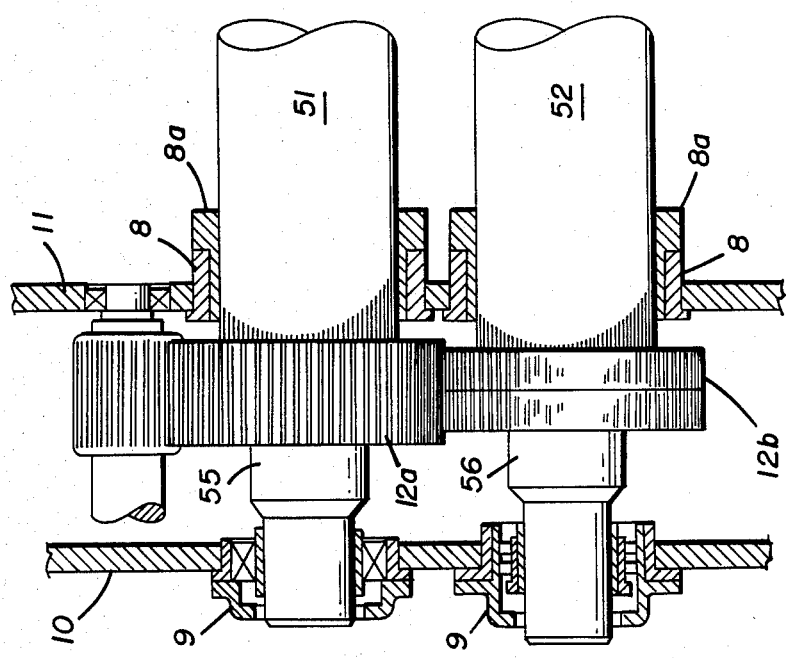
FIG. 6 is a cut-away showing in section the drive arrangement and supports at the opposite end of the rollers of FIG. 5.

Referring now to FIG. 5 and FIG. 6, there are shown like numbers for like parts appearing on FIG. 1 as applied to one set of rollers and cutters which illustrate the mechanism by which I achieve the relative axial motion of one shaft and adjustment of the cutting blades while in motion. The upper backlash gears 12a are shown with wider faced teeth than the lower ones 12b to permit this relative motion as hereinbefore mentioned. Shaft 51 shown on FIG. 5 has positioned on its reduced end 53a spherical or tapered roller bearing 54 in housing 55 which prevents axial motion of shaft 51 and consequently of roller 6b. This entire assembly is carried by outside bearing holders 9 on the opposite end of shafts 51 and 52 as seen on FIGS. 5 and 6. The reduced end of shafts 51 and 52 are carried in ordinary sleeve or roller bearings as shown in holder 9 mounted on frame 10. A similar condition is true of the corresponding end of shaft 52 in FIG. 6. The bearing positioned thereon permits axial motion of shaft 52. The usual bearing seals are provided at 8a.

An important feature of my invention is shown in cross-section at the lower end of FIG. 5. At the right end of shaft extension 57 when facing FIG. 5 is shown the mechanism whereby shaft 52 may be moved axially along with drive gears 12b while it is in rotation, thus bringing the helical blades 13 and 14 in closer contact as illustrated in FIG. 4. Here I use a sleeve-type roller bearing 58 mounted in housing 59 which is fastened to bearing support plate 10 as shown. To this bearing housing I attach an additional adjuster housing 60 which is fastened to the bearing housing by means of bolts 61. A clamp 62 serves to fasten to this adjuster housing the adjusting nut 63 which is threaded to receive adjusting screw 64. Adjusting screw 64 is equipped with collars 65 which hold in position thrust bearing 66. Thrust bearing 66 is positioned in the recess 67 in shaft 57 so that it can transmit the motion from adjusting screw 64 to shaft 57. Adjusting screw 64 is equipped with adjusting knob 68 which is disposed for rotating adjusting nut 63 and consequently movement of the threaded adjusting shaft 64. Adjusting knob lock 69 serves to hold adjusting knob 68 in any desired position after it has been so adjusted. It is thus evident that since adjusting shaft 64 may be moved in either direction while exerting a thrust on shaft 57 to bearing 67, axial adjustment may be made to shaft 57 while it is in rotation.

While I have shown the device of FIG. 5 and FIG. 6 applied to lower shafts 51 and 52, it is evidentially equally applicable to the upper roller shafts 5 of FIG. 1.

Adjusting knobs 68 and 69 are equipped with radial holes as shown for the insertion of operating levers (not shown) to assist in turning of these knobs.

OPERATION

The angle of the helix or helical angle of the cutting blade on the cylinder is designated as Theta on FIG. 4 and will vary with the particular application, such as web width, shear resistance and load carrying capacity of shaft, meachine bearings, shaft bearings and frame. I have found the usual range of five-tenths of a degree to three degrees to be satisfactory, with an average of one and one-half degrees. The adjustment of the blades towards each other will then vary from the tangent of one-half a degree to the tangent of three degrees or 0.0087" to 0.0612" per inch of axial movement of shaft 52 or blade 13. The pitch of my adjusting screw 64, I may make 12 threads per inch thus obtaining an easy movement of the blades towards each other of from less than one-thousandth of an inch to approximately five-thousandths of an inch per turn. With a travel of one-half inch from the central position shown on FIG. 4 and a helix angle of one and one-half degrees, I may obtain an adjustment of thirteen-thousandths of an inch.

My lugs 68 and 69 are equipped with axial holes for the insertion of levers not shown for turning the lugs.

Whenever the blades have become dull and we are obtaining irregular or unsatisfactory cuts, we merely adjust screw 64 to bring lower cutting blade 13 in closer contact with upper blade 14 and the difficulty is overcome without having to shutdown the machine and take time to make the adjustment.

ALTERNATE EMBODIMENT

While I have disclosed a device whereby one of a pair of co-acting helical cutting blades is moved axially while its companion blade remains in the same horizontal position, I have found that my device will work well and in fact to a certain extent more advantageously if both co-acting blades are disposed for simultaneous axial movement.

In this embodiment I apply the mechanism shown on the right end of shaft 52 on the right end of shaft 51 in place of the spherical or roller bearing 54. I then apply the mechanism shown on the right end of shaft 52 on FIG. 5 to the right end of shaft 51, namely the bearings 58 in housing 59. I then install an adjuster housing 60 with its appurtenant elements as shown on the end of shaft 52 and adapt shaft end 53 to accept adjusting screw 64, knobs 68 and 69, adjusting nut 63, collars 65 and thrust bearing 66. In other words, I duplicate the mechanism disclosed on the outer end of shaft 52 to the outer end of shaft 51, and thus am able to effect simultaneous axial motion to shaft 51 and consequently obtain twice the amount of adjustment in clearance between the helical blades as in the former embodiment.

I claim:

1. In a rotary web shearing machine having at least a first roller and a second roller each of said rollers having positioned on their outer surfaces helical cutting blades arranged for co-acting with each other and means for driving said rollers in opposite directions of rotation so as to produce a cutting action between cutting edges on said blades;

said rollers being mounted on shafts in bearings positioned in bearing housing on a frame of said machine;

said means for driving said rollers in opposite directions comprising a first spur gear and a second spur gear positioned on opposite ends of said shafts on said first roller and said second roller respectively and meshing with each other;

said spur gears being of the backlash preventing type;

the total width of the tooth face of said first spur gear being less than the total width of the tooth face of said second spur gear;

said first shaft said first spur gear and said first roller being free to move in an axial direction simultaneously while said gears are in mesh;

means for imparting an axial motion to said first shaft said first roller within its bearings, and said first spur gear;

means for holding said second roller in a fixed horizontal position within its bearings;

means for maintaining both of said rollers in simultaneous rotation and cutting action while imparting said simultaneous axial motion to said first shaft said first spur gear and said first roller;

thereby altering the clearance between the cutting edges of said blades while said blades are in cutting action with each other.

2. The rotary web shearing machine of claim 1 having at least one pair of rollers each of said rollers having positioned on their outer surfaces helical cutting blades arranged for co-acting with each other and means for driving said rollers in opposite directions of rotation so as to produce a cutting action between cutting edges on said blades;

said rollers being mounted on shafts in bearings positioned in housings on a frame in said machine;

means for imparting an axial motion to one of said pair of rollers while maintaining the other of said pair of rollers in a fixed horizontal position and in simultaneous rotation thereby altering the clearance between the cutting edges of said blades while said blades are in cutting action with each other.

3. The device of claim 1 or claim 2 in which said means for imparting said axial motion to said rollers while said rollers are in rotation comprises:

a hollow section in one end of the shaft in said rollers;

an adjusting housing positioned around said hollow end of said shaft;

said adjusting housing being fixedly positioned on one end of said bearing housings of said rollers;

a thrust bearing positioned in a circumferential groove in said hollow section of said shaft engaging said end of said shaft;

thrust collars positioned in contact with opposite faces of said thrust bearing;

a threaded shaft engaging said thrust collars and projecting horizontally through said adjusting housing;

a nut engaging said threaded shaft and fastened to the exterior of said adjusting housing;

an adjusting knob forming a part of said nut and disposed to effect the rotation of said nut and consequently the horizontal movement of said threaded shaft;

a locking knob in threaded relation to said threaded shaft and positioned thereon adjacent said adjusting knob;

whereby said threaded shaft is maintained in a fixed position.

4. The device of claim 1 or claim 2 in which said means for holding said second roller in a fixed horizontal position within its bearings comprises spherical roller bearings positioned within a housing engaging one end of the shaft of said roller.

5. The device of claim 1 or claim 2 in combination with a rotary web shearing machine employing a plurality of pairs of rollers with helical cutting blades disposed to provide axial adjustment to one of said pairs while said machine is in operation.

6. The device of claim 1 or claim 2 in combination with a rotary web shearing machine employing a plurality of pairs of rollers with helical cutting blades disposed to provide axial adjustment to one member of each of said pairs while retaining a fixed horizontal position to the opposite member of each of said pairs while said machine is in operation.

* * * * *